United States Patent
Wang et al.

(10) Patent No.: US 8,040,922 B2
(45) Date of Patent: Oct. 18, 2011

(54) APPARATUS AND METHOD OF FRAME SYNCHRONIZATION IN BROAD BAND WIRELESS COMMUNICATION SYSTEMS

(75) Inventors: Xin Wang, Beijing (CN); Yuuta Nakaya, Kawasaki (JP); Syuusaku Suzuki, Yokohama (JP); Michiharu Nakamura, Kawasaki (JP); JianMin Zhou, Beijing (CN); Hiroyuki Hayashi, Beijing (CN)

(73) Assignee: Fujitsu Limited, Kawasaki (JP)

( * ) Notice: Subject to any disclaimer, the term of this patent is extended or adjusted under 35 U.S.C. 154(b) by 873 days.

(21) Appl. No.: 12/044,122

(22) Filed: Mar. 7, 2008

(65) Prior Publication Data

US 2008/0259904 A1 Oct. 23, 2008

(30) Foreign Application Priority Data

Apr. 18, 2007 (CN) .......................... 2007 1 0096462

(51) Int. Cl.
*H04J 3/06* (2006.01)
(52) U.S. Cl. ..................... 370/510; 370/350; 370/395.62
(58) Field of Classification Search .................. 370/203, 370/208, 318, 324, 347, 350, 365, 395.62, 370/503, 507, 510–514, 516, 518; 275/354, 275/355, 362, 364, 365, 366, 368, 371; 375/354, 375/355, 362, 364, 365, 366, 368, 371
See application file for complete search history.

(56) References Cited

U.S. PATENT DOCUMENTS

| | | | | |
|---|---|---|---|---|
| 5,258,980 A * | 11/1993 | Maebara et al. | ............... | 370/347 |
| 5,329,558 A * | 7/1994 | Larsson et al. | ................. | 375/365 |
| 7,116,632 B2 * | 10/2006 | Alapuranen | ................... | 370/208 |
| 2005/0207334 A1* | 9/2005 | Hadad | ........................... | 370/203 |
| 2007/0201539 A1* | 8/2007 | Yu et al. | ......................... | 375/148 |
| 2008/0095264 A1* | 4/2008 | Deng et al. | .................... | 375/296 |
| 2008/0212563 A1* | 9/2008 | Birru | ............................. | 370/350 |

* cited by examiner

*Primary Examiner* — Andrew Lai
(74) *Attorney, Agent, or Firm* — Katten Muchin Rosenman LLP (57) ABSTRACT

The present invention relates to an apparatus and method of frame synchronization in broad band wireless communication systems. In an apparatus of frame synchronization in a mobile station, a time variant phase rotation compensator eliminates time variant phase rotation carried in received signals by conjugated multiplication between adjacent signal samples. Then, the processed signal is fed into a delay correlator to calculate a plurality of correlations between two successive frames. A local power calculator acquires an average power of several symbols centered on delayed correlation values. A normalizer normalizes the delayed correlation values with a local average power corresponding to the delayed correlation values. A maximum value detector selects the maximum value from normalized correlation values to trigger frame synchronizing and timing signals.

20 Claims, 8 Drawing Sheets

APPARATUS AND METHOD OF FRAME SYNCHRONIZATION IN BROAD BAND WIRELESS COMMUNICATION SYSTEMS

FIELD OF THE INVENTION

The present invention relates to an apparatus and method for frame synchronization in mobile stations (MS) in communication systems based on orthogonal frequency domain multiplexing (OFDM) or orthogonal frequency domain multiplexing access (OFDMA), and more particularly to an apparatus and method for frame synchronization in mobile stations (MS) in TDD (time division duplex)-based OFDM or OFDMA communication systems.

BACKGROUND OF THE RELATED ART

Frame synchronization is very important to packet data transmission in OFDM or OFDMA communication systems. In an OFDM or OFDMA-based communication system, such as IEEE 802.16d/e system, the apparatus of frame synchronization is responsible for detecting the beginning instant of a frame. With the beginning instant of the frame detected, it is possible to feed the preamble symbol and the following symbols into a Fast Fourier Transform (FFT) module for further processing in accordance with a fixed symbol length. On the other hand, most receivers require an automatic frequency correction (AFC) unit to correct carrier frequency offset (CFO) between the mobile station (MS) and the base station (BS). AFC can be realized by adjusting a voltage-controlled oscillator (VCO) or a numeral-controlled oscillator (NCO). As described below, adjustment of CFO affects the performance of frame synchronization.

Figure 1:
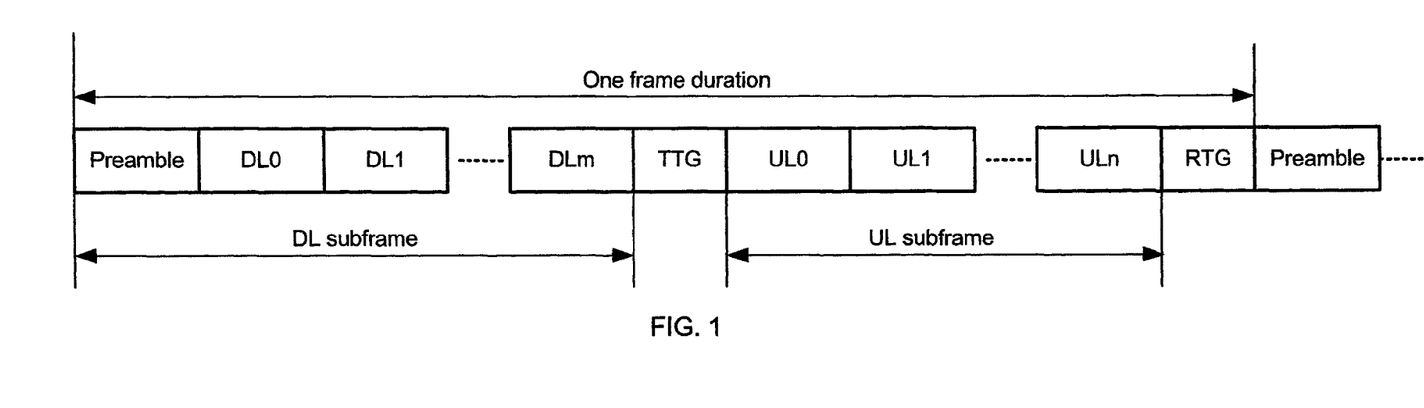
FIG. 1 shows a frame structure of the TDD-OFDM/OFDMA communication system.

FIG. 1 shows a typical structure of a frame of the TDD-OFDM/OFDMA system, which frame includes a downlink (DL) sub-frame and an uplink (UL) sub-frame. A receive/transmit transition gap (RTG) separates the UL sub-frame from the DL sub-frame, and a transmit/receive gap (TTG) separates the DL sub-frame from the UL sub-frame. The first symbol of a frame is a training symbol called "preamble", which is a sign of the beginning of the frame. The preamble symbol is transmitted in every frame, and its power is specified several dB higher than that of a normal data symbol. The common symbol and power boosting properties of the preamble symbol are contributive to realization of frame synchronization.

Figure 2:
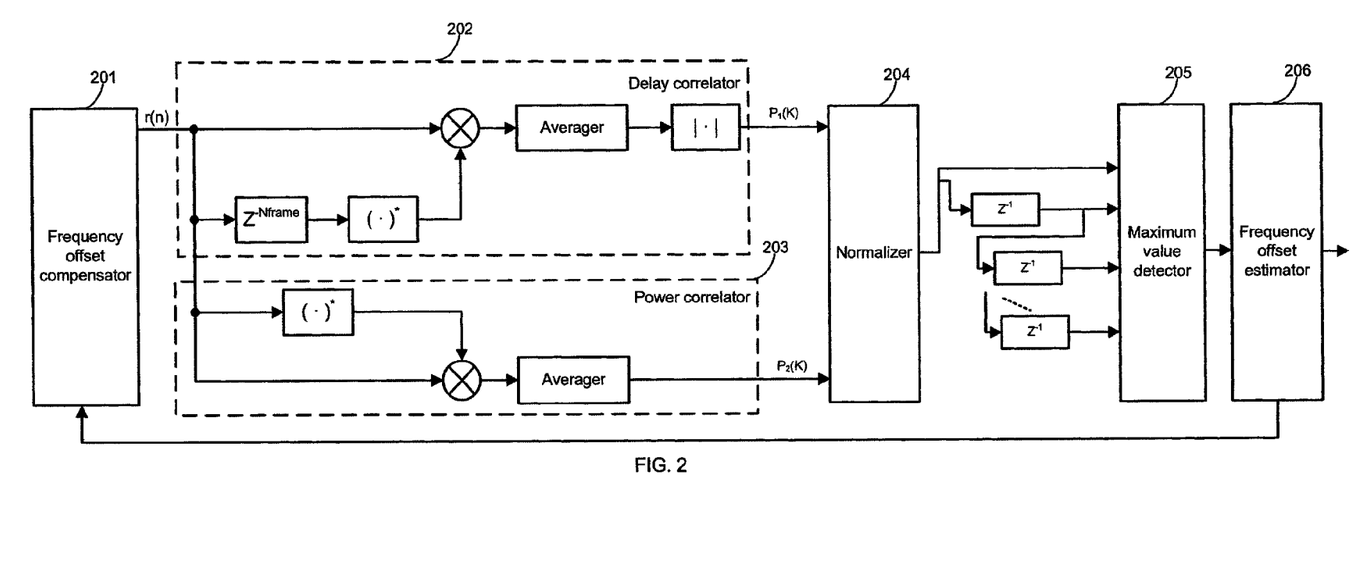
FIG. 2 is a block diagram showing a conventional apparatus of frame synchronization of the OFDM communication system.

FIG. 2 shows a conventional apparatus of frame synchronization based on the preamble symbol.

As shown in FIG. 2, two adjacent frames are cross-correlated in a delay correlator 202, and a correlation peak as obtained corresponds to the beginning position of the preamble symbol. However, adjustment of an AFC unit to the frequency will affect the correlation value of the preamble symbol.

Suppose the receiving signal of a previous frame be $r(n-N_{frame})$, wherein n is the sequence number of a time domain sample, and $N_{frame}$ is the number of samples in one frame duration; let a normalized frequency offset be $\delta f_1 = \delta f_1/\Delta f$, wherein $\Delta f$ is subcarrier spacing and $\hat{\delta} f_1$ is CFO between MS and BS. This receiving signal can be modeled as Equation (1).

$$r(n-N_{frame}) = r'(n-N_{frame})e^{-j2\pi n \delta f_1/N_{fft}} \quad (1)$$

where r'(n) is the received signal without frequency offset from the transmitter, $N_{fft}$ is the FFT window size of the OFDM signal.

Suppose the frequency offset estimated in a frequency offset estimator 206 be $\hat{\delta} f_1$, AFC acts before the current frame comes, that is to say, the frequency offset is compensated in a frequency offset compensator 201. The residual frequency offset is as follows:

$$\delta f_2 = \delta f_1 - \hat{\delta} f_1 \quad (2)$$

This results in a frequency offset difference between the two frames. The receiving signal of the current frame can be modeled as Equation (3).

$$r(n) = r'(n)e^{-j2\pi n \delta f_2/N_{fft}} \quad (3)$$

The cross-correlation of the two frames is given by Equation (4) below:

$$P_1(n) = \left| \sum_{k=1}^{N_{sym}} r(n+k)r^*(n+k-N_{frame}) \right| \quad (4)$$

$$= \left| \sum_{k=1}^{N_{sym}} r'(n+k)r'^*(n+k-N_{frame})e^{-j2\pi(\delta f_1 - \delta f_2)k/N_{fft}} \right|$$

where n is the running index of the time domain sample corresponding to the output correlation value, k is the index of the sample for the correlation calculation in an OFDM symbol, and correlation window length is a symbol, namely $N_{sym}$.

If without consideration of CFO difference between two successive frames, there will always be a correlation peak at the beginning of the preamble symbol due to similarity of the received preamble symbol. However, every item in Equation (4) carries a time variant phase rotation $e^{-j2\pi(\delta f_1 - \delta f_2)k/N_{fft}}$ introduced by CFO difference. The phase rotation is changed as k changing, which turns a near in-phase summation into a vector summation when the preamble symbol is fed into the correlation window. The correlation peak of the preamble symbol is not prominent especially when CFO is big. Accordingly, it is difficult to search the beginning of the frame in this case, that is, false timing probability will increase.

This problem can be solved by stopping AFC adjustment during the frame timing period. However, an additional feedback control circuit from the timing synchronization apparatus is required and much synchronization time is consumed.

On the other hand, RTG and TTG in the TDD-OFDM/OFDMA system tend to lead to false frame detection with conventional methods. In conventional methods correlation value $P_1(n)$ is usually normalized by the corresponding symbol power $P_2(n)$ to eliminate the channel fading influence. The power of the current symbol is calculated in a power calculator 203 by the following Equation:

$$P_2(n) = \left| \sum_{k=1}^{N_{sym}} r(n+k)r^*(n+k) \right| \quad (5)$$

$P_1(n)$ is normalized by $P_2(n)$ in a normalizer 204, that is:

$$\varepsilon(n) = \frac{P_1(n)}{P_2(n)} \quad (6)$$

The normalizing power $P_2(n)$ is very small within or around RTG/TTG. By this time, at the ending terminal or the beginning terminal of the UL/DL sub-frame, the correlator 202 combines several samples of an end symbol with RTG or TTG together as one OFDM symbol to perform the correlation calculation. It is easy for several residual samples to be closely correlated. Thus, the difference between $P_1(n)$ and $P_2(n)$ is very small, and this results in the fact that the normalized $\epsilon(n)$ around RTG/TTG is often bigger than the normalized correlation value of the preamble symbol. This phenomenon is most notable in RTG period because the power of UL received by a mobile station may be tens of dB higher than the power of DL when a neighboring user is transmitting signals.

Because of the same reason, the false correlation peak also tends to appear in null symbols of a frame where no data transmission is scheduled or around symbols of a frame where the power of transmission is boosted or decreased.

SUMMARY OF THE INVENTION

The present invention is proposed in view of the aforementioned problems. The present invention is directed to providing an apparatus and method of frame synchronization in broad band wireless communication systems, so as to remove the aforementioned defects and deficiencies existent in the prior art apparatuses and methods of frame synchronization.

An object of the present invention is to provide an apparatus and method for fast and reliable frame detection.

Another object of the present invention is to provide an apparatus and method for reducing the time required for realizing downlink synchronization in an OFDM/OFDMA system.

Yet another object of the present invention is to provide an apparatus and method capable of realizing both time synchronization and frequency synchronization in the same frame.

Still another object of the present invention is to eliminate false frame detection caused by RTG and TTG.

Still yet another object of the present invention is to eliminate false frame detection caused by null symbols and mutations of transmission power in the frame.

According to one aspect of the present invention, there is provided an apparatus of frame synchronization for a broad band wireless communication system, which apparatus can be used in combination with m (m is a positive integer) number of Rx branch receiver(s), and comprises m number of time variant phase rotation compensators whose inputs are signal samples $r_1(n)$ to $r_m(n)$ (n indicates the running index of a signal sample in time domain) corresponding to each receiving branch, functioning to eliminate time variant phase rotations carried by the signal samples $r_1(n)$ to $r_m(n)$ due to CFO, so as to output signal samples $D_1(n)$ to $D_m(n)$ without time variant phase rotation; a delay correlator for correlating the signal samples $D_1(n)$ to $D_m(n)$ with signal samples $D_1(n-N_{frame})$ to $D_m(n-N_{frame})$ ($N_{frame}$ is the number of samples over one frame duration) delaying one frame; a local power calculator for calculating local average power of a plurality of symbols corresponding to and centered on delayed correlation; a normalizer for normalizing delayed correlation value calculated by the delay correlator by using the local average power calculated by the local power calculator; and a maximum value detector for detecting a maximum value from normalized delayed correlation values over one frame duration.

According to the aforementioned apparatus of frame synchronization, the time variant phase rotation compensators eliminate, after AFC, time variant phase rotations carried by the received signal samples due to carrier frequency offset (CFO). Moreover, and more particularly, the power detected by the local power calculator is the average power of several symbols centered on the delayed correlation instant, and this is to compensate the problem that the power of the signals is relatively weak when correlation is performed around RTG/TTG or the null symbols.

When m is selected as equaling to 1, the apparatus of frame synchronization becomes an apparatus of frame synchronization for a single receiving branch receiver, namely an apparatus of frame synchronization for an SISO system. When m is greater than 1, the apparatus of frame synchronization is suitable for SIMO or MIMO systems.

According to another aspect of the present invention, there is provided a method of frame synchronization for a broad band wireless communication system, which method can be used in combination with an m (m is a positive integer) number of Rx branch receiver(s), and comprises respectively eliminating, corresponding to m number of signal samples $r_1(n)$ to $r_m(n)$ (n indicates the sequence number of a signal sample), time variant phase rotations carried by the signal samples $r_1(n)$ to $r_m(n)$ due to carrier frequency offset, so as to output signal samples $D_1(n)$ to $D_m(n)$ without time variant phase rotation; correlating the signal samples $D_1(n)$ to $D_m(n)$ with signal samples $D_1(n-N_{frame})$ to $D_m(n-N_{frame})$ ($N_{frame}$ is the number of samples in one frame duration) delaying one frame; calculating local average power of a plurality of symbols centered on corresponding delayed correlation; normalizing delayed correlation value calculated at the delay correlating step by using the local average power calculated at the local power calculating step; and detecting a maximum value from normalized delayed correlation values over one frame duration.

When m is selected as equaling to 1, the method of frame synchronization is applicable for an SISO system. When m is greater than 1, the method of frame synchronization is applicable for receivers having SIMO or MIMO systems.

BRIEF DESCRIPTION OF THE DRAWINGS

The aforementioned and other objects, characteristics and advantages of the present invention will become more apparent upon perusal of the detailed descriptions that follow with reference to the accompanying drawings, in which.

EMBODIMENTS OF THE INVENTION

The present invention is directed to providing a robust frame timing apparatus and method in the TDD-OFDM/OFDMA system.

The present invention is further directed to reducing time required for frame synchronization and freeing the operation of AFC during the frame synchronization process.

Explanations are made below with regard to an OFDM system with a common training symbol at the beginning of every frame. But it is easily appreciated to a person skilled in the art that the embodiments to be hereinafter discussed are also applicable to an OFDMA system. Moreover, unless otherwise specified, signs and symbols employed hereinafter in the equations denote the same meanings as the signs and symbols employed hereinbefore.

Figure 3:
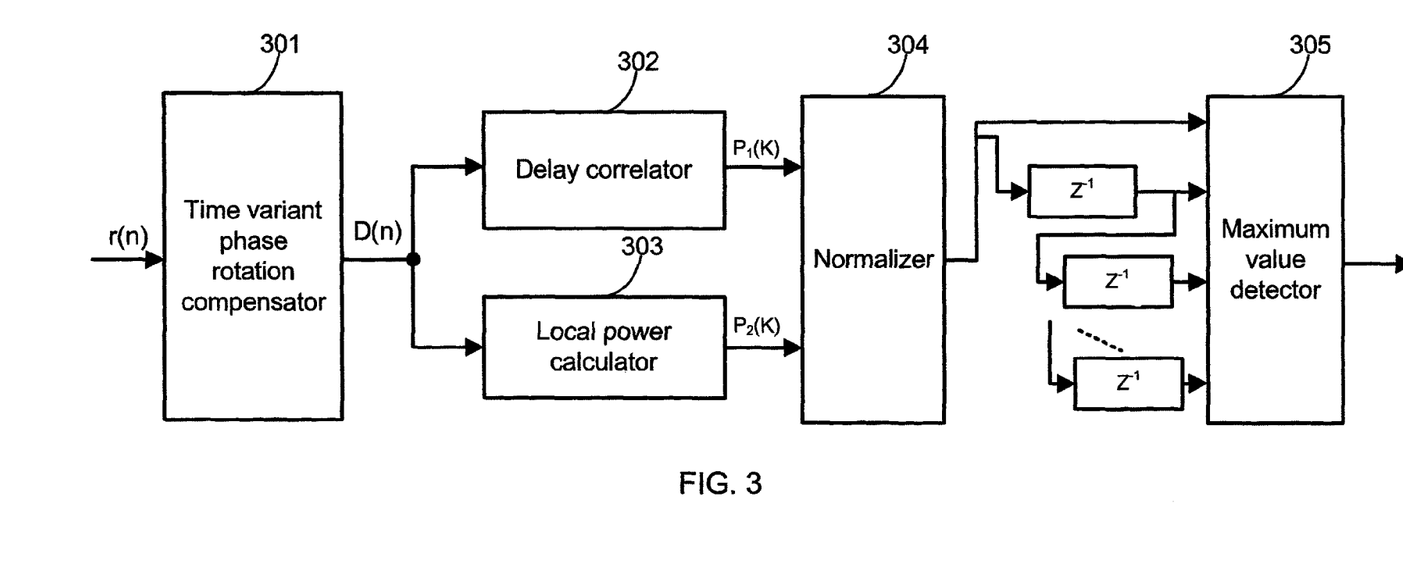
FIG. 3 is a block diagram showing an apparatus of frame synchronization for an MS in the OFDM communication system according to an embodiment of the present invention.

FIG. 3 is a block diagram showing the apparatus of frame synchronization for an SISO receiver in the OFDM system according to an embodiment of the present invention.

As shown in FIG. 3, the apparatus of frame synchronization comprises: a time variant phase rotation compensator 301, which receives a signal r(n), eliminates the time variant phase rotation of the signal r(n) due to CFO, and outputs a signal sample D(n) having undergone time variant phase rotation compensation; a delay correlator 302, which correlates the inputted signal D(n) with a signal $D(n-N_{frame})$ delayed for one frame, and outputs a delayed correlation value $P_1(n)$; a local power calculator 303, which calculates an average power of a plurality of symbols centered on a delayed correlation, and outputs a local average power value $P_2(n)$ that corresponds to the delayed correlation; a normalizer 304, which normalizes the delayed correlation value $P_1(n)$ by using the local average power value $P_2(n)$ of the delayed correlation; and a maximum value detector 305, which detects a maximum value from normalized delayed correlations over one frame duration.

To avoid false frame timing due to frequency offset difference between two successive frames, the time variant phase rotation compensator 301 is employed to eliminate additional phase rotation.

Figure 4:
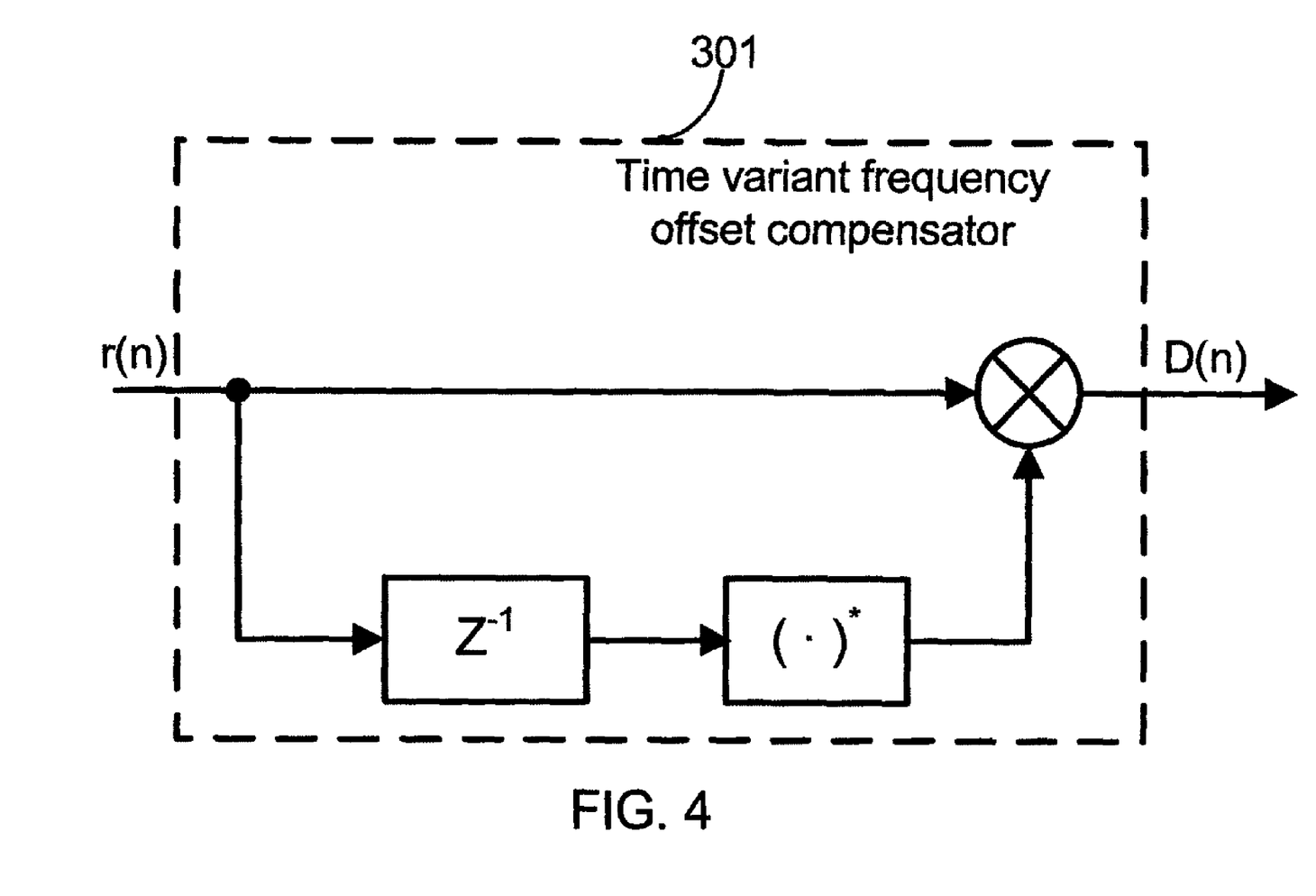
FIG. 4 shows the structure of a time variant phase rotation compensator of the apparatus of frame synchronization for an MS in the OFDM communication system according to the embodiment of the present invention.

FIG. 4 shows the structure of the time variant phase rotation compensator 301. In the time variant phase rotation compensator 301, the inputted sample r(n) is conjugatedly multiplied with the previous sample r(n−1) stored in a register. This equals to subtracting the angles of the two samples according to Equation (7).

$$D(n)=r(n)r^*(n-1)=r'(n)e^{-j2\pi n\delta f_1/N_{fft}}r'(n-1)e^{-j2\pi(n-1)\delta f_1/N_{fft}}=D'(n)e^{-j2\pi\delta f_1/N_{fft}} \quad (7)$$

where $\delta f_1$ is the normalized frequency offset of the current frame, and D'(n) indicates the signal sample without frequency offset.

Figure 5:
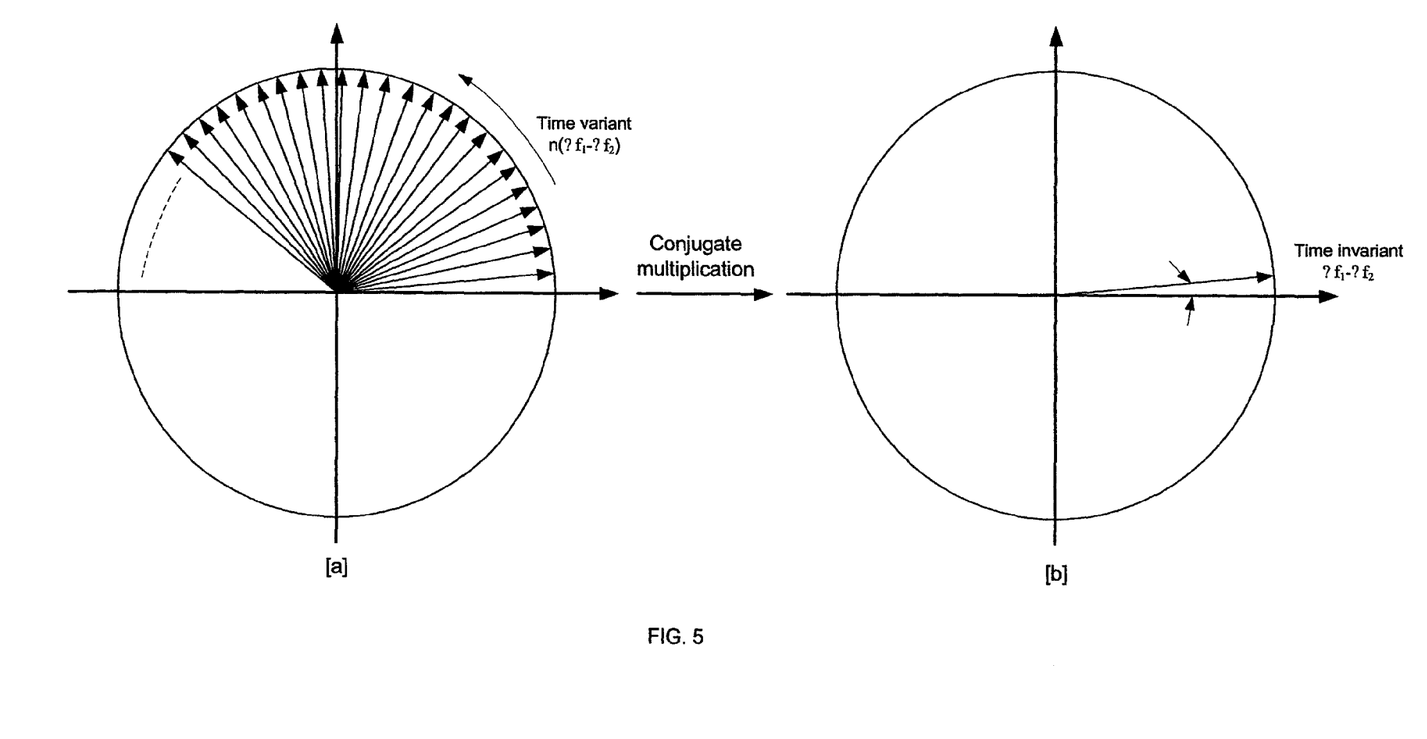
FIG. 5 shows the effect of the time variant phase rotation compensator.

In Equation (7), the additional phase rotation is constant, and does not vary with n in D(n). This is also true for the previous frame of signal, after this differential processing:

$$D(n-N_{frame}) = r(n-N_{frame})r^*(n-N_{frame}-1) \quad (8)$$
$$= r'(n-N_{frame})r'(n-N_{frame}-1)e^{-j2\pi\delta f_2/N_{fft}}$$
$$= D'(n-N_{frame})e^{-j2\pi\delta f_2/N_{fft}}$$

where $\delta f_2$ is the normalized frequency offset of the previous frame. Thus, the time variant phase rotation carried by each sample is canceled; and each sample in the new differential receiving sequence carries with a fixed phase rotation in one frame duration, as shown in FIG. 5.

The differential signal D(n) is taken as the receiving signal, and time domain correlation is calculated in the delay correlator 302.

Figure 6:
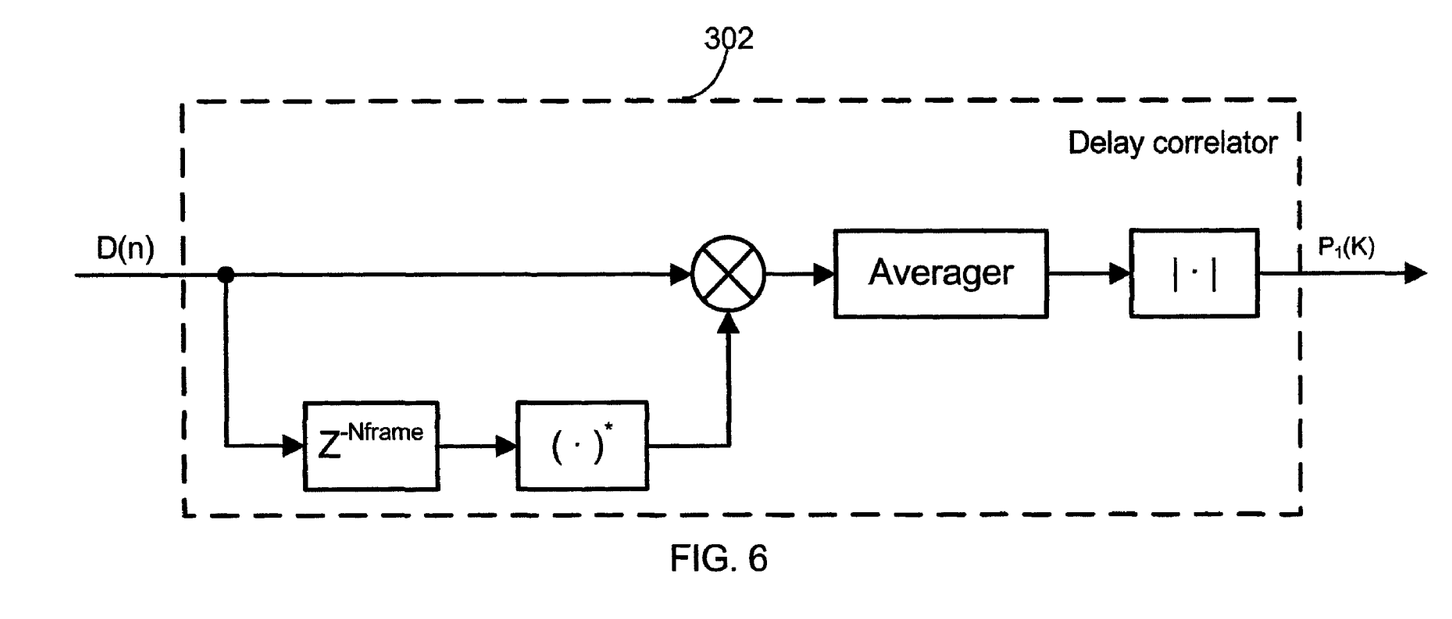
FIG. 6 shows the structure of a delay correlator of the apparatus of frame synchronization in the OFDM communication system according to an embodiment of the present invention.

FIG. 6 shows the structure of the delay correlator 302. The inputted sample D(n) is correlated with the sample $D(n-N_{frame})$ delayed for one frame in the delay correlator 302. The correlation window length is the OFDM symbol length $N_{sym}$. Note that, unlike the delayed correlation calculation in Equation (4), the summation of Equation (9) is performed with samples in half delayed symbol and half forthcoming symbol. In Equation (9), phase rotation due to CFO is further eliminated by modulus calculation. As a result, correlation of the apparatus of frame synchronization is irrelevant to the AFC operation. This makes it possible for the AFC to operate freely without consideration of its influence on frame timing.

$$P_1(n) = \left| \sum_{k=-N_{sym}/2+1}^{N_{sym}/2} D(n+k)D^*(n+k-N_{frame}) \right| \quad (9)$$
$$= \left| e^{-j2\pi(\delta f_1 - \delta f_2)/N_{fft}} \sum_{k=-N_{sym}/2+1}^{N_{sym}/2} D'(n+k)D'(n+k-N_{frame}) \right|$$
$$= \left| \sum_{k=-N_{sym}/2+1}^{N_{sym}/2} D'(n+k)D'(n+k-N_{frame}) \right|$$

where n is the running index of the time domain sample corresponding to the output correlation value, and k is the index of a sample for the correlation calculation in an OFDM symbol.

Figure 7:
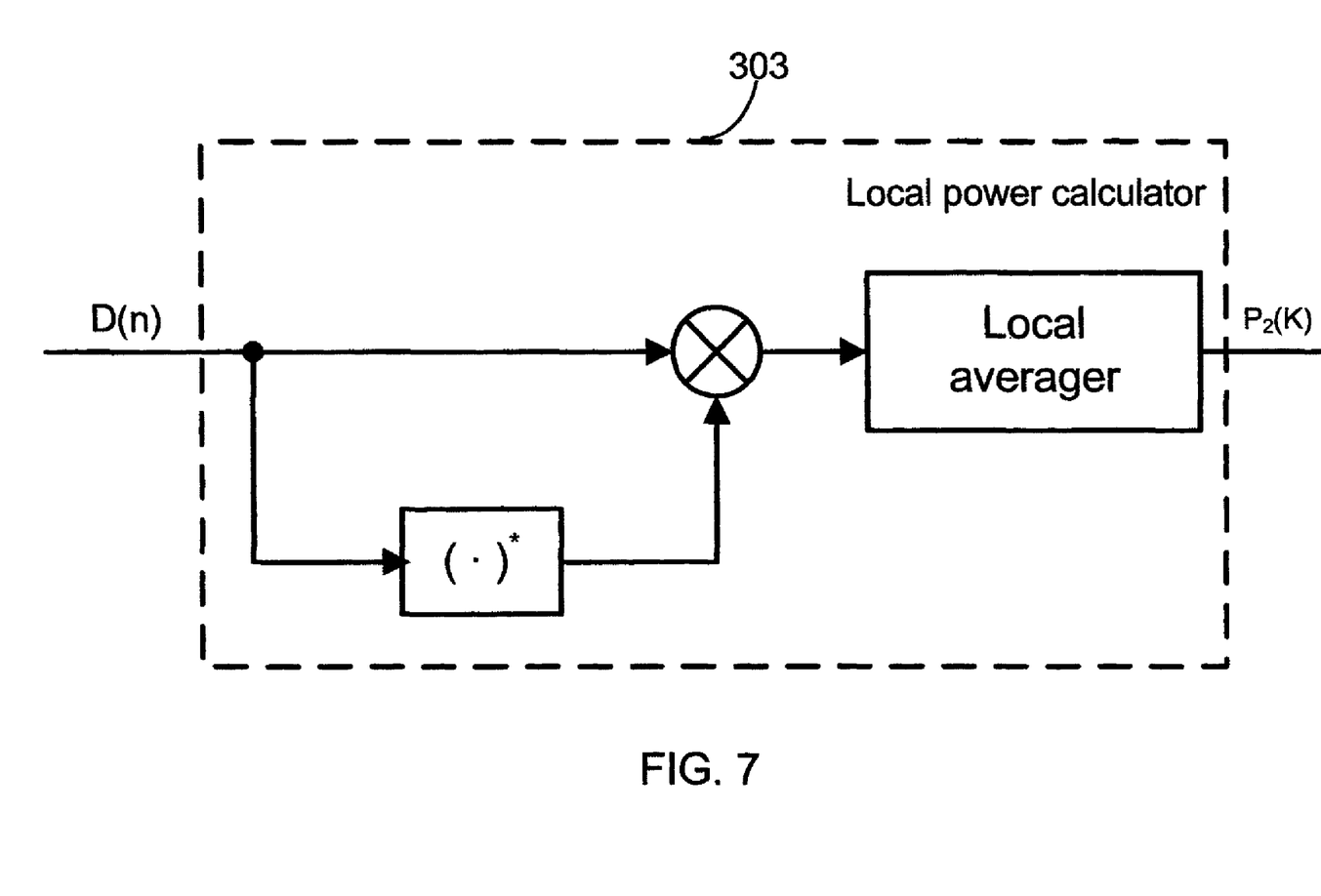
FIG. 7 shows the structure of a local power calculator of the apparatus of frame synchronization in the OFDM communication system according to the embodiment of the present invention.

In order to eliminate the false frame detection in the entire RTG/TTG period, a local power calculator 303 is utilized with the structure as shown in FIG. 7. Unlike the power calculator 203 in FIG. 2, an average power of γ symbols centered on a time instant k is calculated by the following Equation (10), where γ is a positive integer:

$$P_2(n) = \left| \frac{1}{\gamma} \sum_{k=-\gamma N_{sym}/2+1}^{\gamma N_{sym}} D(n+k)D^*(n+k) \right| \quad (10)$$

It should be noted that γ=3 is the optimal choice under the consideration of both accuracy and reliability.

In the normalizer 304 the delayed correlation value $P_1(n)$ is normalized by using the local average power $P_2(n)$ through Equation (11):

$$\varepsilon(n) = \frac{P_1(n)}{P_2(n)} \quad (11)$$

Because the normalized power is the average power of γ symbols (e.g. 3, 4) rather than the power of one symbol, abnormal correlation peak in the entire RTG or TTG period is eliminated.

Taking consideration of the null symbols in the DL/UL, both the delay correlator and the local power calculator are designed as symmetric structures. The correlation window is located at the center of the local power calculation window, thus balancing the sudden power change of either the power boosting or the silent transmission.

In the maximum value detector 305, the maximum correlation value is selected among correlation outputs of one frame duration, that is:

$$t_{frame} = \underset{n=1:N_{frame}}{\mathrm{argmax}}\,(\varepsilon(n)) \qquad (12)$$

The timing instant $t_{frame}$ corresponds to the center of the preamble symbol and can be shifted to half symbol length as a frame timing clock. At the same time, the frequency offset can be estimated based on this output timing signal and is fed back to AFC for compensation. Therefore, both time synchronization and frame synchronization can be realized in the same frame.

The aforementioned method according to the present invention can be further extended to multiple Rx branches receiver, for instance, MS apparatuses in MIMO and SIMO systems. Combining method such as the selective combining or maximum ratio combining (MRC) method can be utilized to combine the correlation outputs to each Rx branch.

Figure 8:
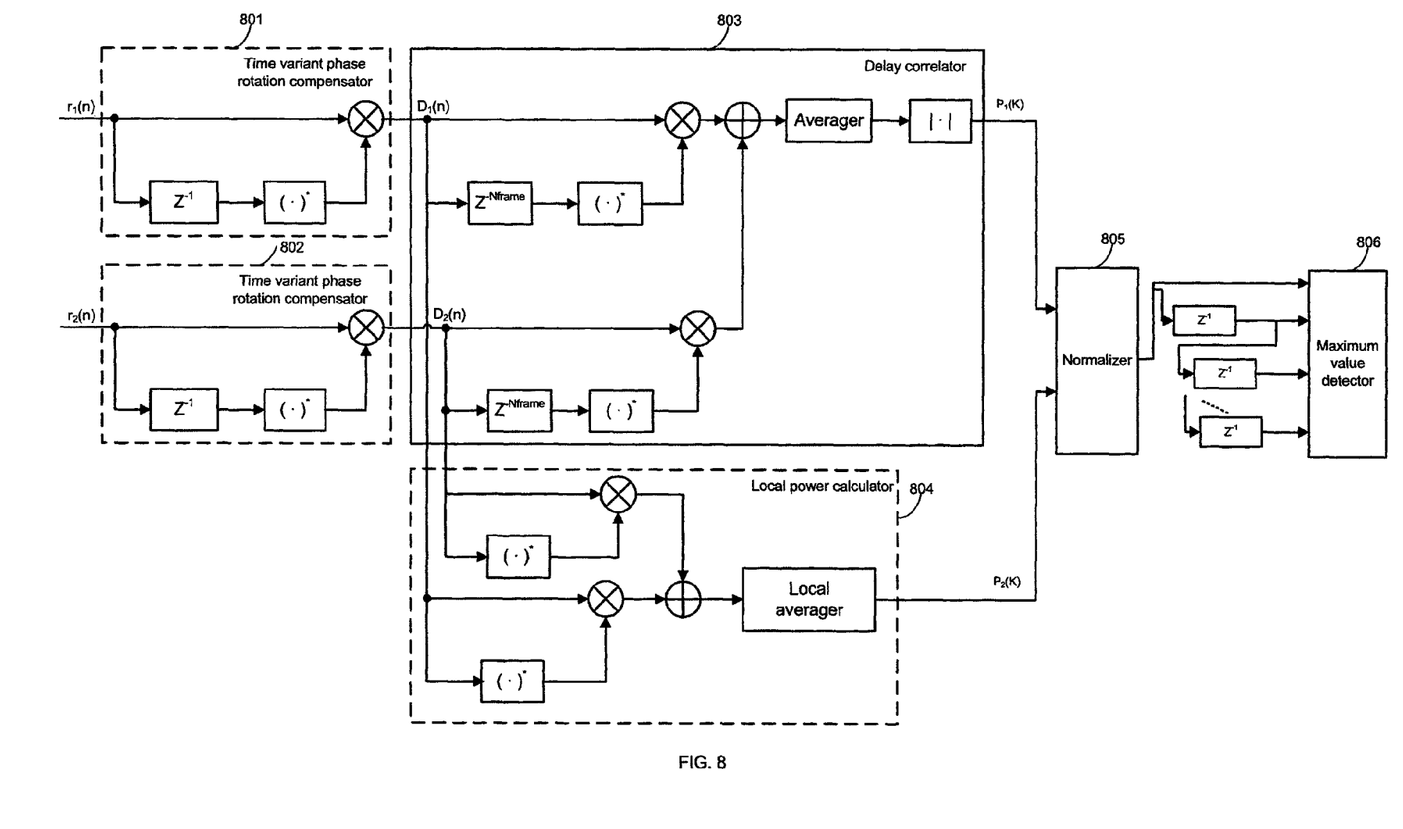
FIG. 8 shows the structure of an apparatus of frame synchronization for an MS with two receiving branches in the OFDM communication system according to the embodiment of the present invention.

FIG. 8 is a block diagram showing an apparatus of frame synchronization of two Rx branches receiver according to the embodiment of the present invention, in which the MRC combining method is used.

The apparatus of frame synchronization as shown in FIG. 8 comprises time variant phase rotation compensators 801 and 802, a delay correlator 803, a local power calculator 804, a normalizer 805 and a maximum value detector 806. The time variant phase rotation compensators 801 and 802, the normalizer 805 and the maximum value detector 806 are the same as the time variant phase rotation compensator 301, the normalizer 304 and the maximum value detector 305 shown in FIG. 3 both in terms of structure and in terms of function, so that no detailed explanations are made here with regard to them.

After conjugate multiplication by the time variant phase rotation compensators 801 and 802 of each Rx branch on the receiving signal, the delayed correlation value $P_1(n)$ and the local power value $P_2(n)$ are calculated in the delay correlator 803 and the local power calculator 804 according to Equations (13) and (14):

$$P_1(n) = \left| \sum_{k=-N_{sym}/2+1}^{N_{sym}/2} \sum_{i=1}^{m} D_i(n+k) D_i^*(n+k-N_{frame}) \right| \qquad (13)$$

$$P_2(n) = \left| \frac{1}{\gamma} \sum_{k=-\gamma N_{sym}/2+1}^{\gamma N_{sym}/2} \sum_{i=1}^{m} D_i(n+k) D_i^*(n+k) \right| \qquad (14)$$

where m is the number of antennas in the receiver, for instance, m=2 in the embodiment as shown in FIG. 8.

As should be noted, the scope of the present invention also includes a computer program executing the claimed method of frame synchronization, and a computer-readable recording medium recording such a program. Herein applicable as the recording medium can be a floppy disk, a hard disk, a semiconductor memory, a CD-ROM, a DVD, a magneto-optical disk (MO), and other media readable by a computer.

Although preferred embodiments are selected alone in the above to exemplarily explain the present invention, it is easy for persons skilled in the art to make various modifications and variations according to the contents disclosed herein and without departing from the scope of invention as defined in the attached claims. The explanations of the aforementioned embodiments are merely exemplary in nature, and should not be understood to restrict the invention as defined by the attached claims and analogues thereof.

The invention claimed is:

1. An apparatus of frame synchronization for a broad band wireless communication system, which can be used in combination with an m (m is a positive integer) Rx branch receiver, comprising:

m number of time variant phase rotation compensators for receiving signal samples $r_1(n)$ to $r_m(n)$ (n is a positive integer indicating a running index of the signal samples), eliminating time variant phase rotations carried by the signal samples $r_1(n)$ to $r_m(n)$ due to Carrier Frequency Offset (CFO), and outputting signal samples $D_1(n)$ to $D_m(n)$ without the time variant phase rotations;

a delay correlator for calculating delayed correlations by correlating the signal samples $D_1(n)$ to $D_m(n)$ with signal samples $D_1(n-N_{frame})$ to $D_m(n-N_{frame})$ ($N_{frame}$ is a number of the signal samples over one frame duration) delaying one frame;

a local power calculator for calculating average power of a plurality of symbols centered on a corresponding delayed correlation;

a normalizer for normalizing delayed correlations output from the delay correlator with the delayed correlations output related local average power output from the local power calculator; and a maximum value detector for detecting a maximum value from the normalized delayed correlations over the one frame duration.

2. The apparatus of frame synchronization of claim 1, wherein the time variant phase rotation compensator eliminates time variant phase rotation by conjugate multiplying every two successive samples $r_i(n)$ and $r_i(n-1)$ as follows, $D_i(n)=r_i(n)r_i^*(n-1)$, where $i=1, 2, \ldots, m$.

3. The apparatus of frame synchronization of claim 2, wherein the delay correlator calculates differential correlations of input frame with its former frame stored in buffer by $$P_1(n) = \left| \sum_{k=-N_{sym}/2+1}^{N_{sym}/2} \sum_{i=1}^{m} D_i(n+k) D_i^*(n+k-N_{frame}) \right|,$$

where $N_{sym}$ indicates a length of a correlation window and is a number of signal samples included in a symbol, and n is the positive integer indicating the running index of one of the signal samples.

4. The apparatus of frame synchronization of claim 3, wherein the length of the correlation window is equal to one symbol.

5. The apparatus of frame synchronization of claim 3, wherein the correlation window is a center window, in which incoming signal samples are centered on the delayed correlations being calculated.

6. The apparatus of frame synchronization of claim 3, wherein the local power calculator calculates the average power of $\gamma$ symbols centered on the corresponding delayed correlation by $$P_2(n) = \left| \frac{1}{\gamma} \sum_{k=-\gamma N_{sym}/2+1}^{\gamma N_{sym}/2} \sum_{i=1}^{m} D_i(n+k) D_i^*(n+k) \right|,$$

where $\gamma$ is a positive integer number.

7. The apparatus of frame synchronization of claim 6, wherein γ=3 is an optimal parameter for the local power calculator.

8. The apparatus of frame synchronization of claim 6, wherein the normalizer normalizes the delayed correlations with their corresponding local average power by $$\varepsilon(k) = \frac{P_1(n)}{P_2(n)}.$$

9. The apparatus of frame synchronization of claim 8, wherein the maximum value detector detects the maximum value from the delayed correlations over one frame duration by:

$$t_{frame} = \arg\max_{n, over one frame} (\varepsilon(n)),$$

where $t_{frame}$ is time corresponding to the detected maximum value.

10. The apparatus of frame synchronization of claim 1, wherein m=1.

11. A method of frame synchronization for a broad band wireless communication system, which can be used in combination with an m (m is a positive integer) Rx branch receiver, comprising:
  a time variant phase rotation compensating step for receiving m number of signal samples $r_1(n)$ to $r_m(n)$ (n is a positive integer indicating a sequence number of the signal samples), eliminating time variant phase rotations carried by the signal samples $r_1(n)$ to $r_m(n)$ due to Carrier Frequency Offset (CFO), and outputting signal samples $D_1(n)$ to $D_m(n)$ without the time variant phase rotations;
  a delay correlating step for calculating delayed correlations by correlating the signal samples $D_1(n)$ to $D_m(n)$ with signal samples $D_1(n-N_{frame})$ to $D_m(n-N_{frame})$ ($N_{frame}$ is a number of the signal samples in one frame duration) delaying one frame;
  a local power calculating step for calculating average power of a plurality of symbols centered on a corresponding delayed correlation;
  a normalizing step for normalizing delayed correlations output at the delay correlating step with the delayed correlations output related local average power output at the local power calculating step; and
  a maximum value detecting step for detecting a maximum value from the normalized delayed correlations over the one frame duration.

12. The method of frame synchronization of claim 11, wherein the time variant phase rotation compensating step eliminates the time variant phase rotation by conjugate multiplying every two successive samples $r_i(n)$ and $r_i(n-1)$ as follows, $D_i(n)=r_i(n)r_i^*(n-1)$, where $i=1, 2, \ldots, m$.

13. The method of frame synchronization of claim 12, wherein the delay correlating step calculates differential correlations of input frame with its former frame stored in buffer by $$P_1(n) = \left| \sum_{k=-N_{sym}/2+1}^{N_{sym}/2} \sum_{i=1}^{m} D_i(n+k)D_i^*(n+k-N_{frame}) \right|,$$

where $N_{sym}$ indicates a length of a correlation window and is a number of signal samples included in a symbol, and n is the positive integer indicating the sequence number of one of the signal samples.

14. The method of frame synchronization of claim 13, wherein the length of the correlation window is equal to one symbol.

15. The method of frame synchronization of claim 13, wherein the correlation window is a center window, in which incoming signal samples are centered on the delayed correlations being calculated.

16. The method of frame synchronization of claim 13, wherein the local power calculating step calculates the average power of γ symbols centered on the corresponding delayed correlation by $$P_2(n) = \left| \frac{1}{\gamma} \sum_{k=-\gamma N_{sym}/2+1}^{\gamma N_{sym}/2} \sum_{i=1}^{m} D_i(n+k)D_i^*(n+k) \right|,$$

where γ is a positive integer number.

17. The method of frame synchronization of claim 16, wherein γ=3 is an optimal parameter for calculating the local average power.

18. The method of frame synchronization of claim 16, wherein the normalizing step normalizes the delayed correlations with their corresponding local average power by $$\varepsilon(n) = \frac{P_1(n)}{P_2(n)}.$$

19. The method of frame synchronization of claim 18, wherein the maximum value detecting step detects the maximum value among the delayed correlations over one frame duration by:

$$t_{frame} = \arg\max_{n, over one frame} (\varepsilon(n)),$$

where $t_{frame}$ is time corresponding to the detected maximum value.

20. The method of frame synchronization of claim 11, wherein m=1.

* * * * *